US011242050B2

(12) United States Patent
Bouton et al.

(10) Patent No.: US 11,242,050 B2
(45) Date of Patent: Feb. 8, 2022

(54) REINFORCEMENT LEARNING WITH SCENE DECOMPOSITION FOR NAVIGATING COMPLEX ENVIRONMENTS

(71) Applicant: HONDA MOTOR CO., LTD., Tokyo (JP)

(72) Inventors: Maxime Bouton, Groslay (FR); Alireza Nakhaei Sarvedani, San Jose, CA (US); Kikuo Fujimura, Palo Alto, CA (US); Mykel John Kochenderfer, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 16/425,482

(22) Filed: May 29, 2019

(65) Prior Publication Data
US 2020/0247402 A1    Aug. 6, 2020

Related U.S. Application Data

(60) Provisional application No. 62/799,593, filed on Jan. 31, 2019.

(51) Int. Cl.
*G01C 22/00* (2006.01)
*C05D 1/00* (2006.01)
(Continued)

(52) U.S. Cl.
CPC ....... *B60W 30/0956* (2013.01); *G05D 1/0088* (2013.01); *G06N 3/0454* (2013.01);
(Continued)

(58) Field of Classification Search
CPC ......... B60W 30/0956; B60W 2554/00; B60W 2554/4049; B60W 60/00274;
(Continued)

(56) References Cited

U.S. PATENT DOCUMENTS

| 2018/0032082 | A1* | 2/2018 | Shalev-Shwartz | ..... G06N 7/005 |
| 2019/0101917 | A1* | 4/2019 | Yao | ................... B60W 50/0097 |

(Continued)

OTHER PUBLICATIONS

Baier, C, et al., Principles of Model Checking, MIT Press, pp. 851-869, 2008.
(Continued)

*Primary Examiner* — Mahmoud S Ismail
(74) *Attorney, Agent, or Firm* — Arent Fox LLP

(57) ABSTRACT

Systems and methods for providing navigation to a vehicle may include receiving observation data from one or more sensors of the vehicle, generating projection data corresponding to the one or more traffic participants based on the observation data for each time step within a time period, and predicting interactions between the vehicle, the one or more traffic participants, and the one or more obstacles, based on the projection data of the one or more traffic participants. The systems and methods may further include determining a set of actions by the vehicle corresponding to a probability of the vehicle safely arriving at a target location based on the predicted interactions, and selecting one or more actions from the set of actions and provide the one or more actions to a navigation system of the vehicle, wherein the navigation system uses the navigation data to provide navigation instructions to the vehicle.

17 Claims, 8 Drawing Sheets

(51) Int. Cl.
| | |
|---|---|
| B60W 30/095 | (2012.01) |
| G08G 1/01 | (2006.01) |
| G08G 1/16 | (2006.01) |
| G05D 1/00 | (2006.01) |
| G06N 3/04 | (2006.01) |

(52) U.S. Cl.
CPC .......... *G08G 1/0129* (2013.01); *G08G 1/166* (2013.01); *B60W 2554/00* (2020.02); *G05D 2201/0213* (2013.01)

(58) Field of Classification Search
CPC ....... B60W 60/00276; B60W 60/0011; B60W 30/18159; B60W 30/18154; G05D 1/0088; G05D 2201/0213; G06N 3/0454; G06N 3/006; G06N 3/088; G06N 3/0481; G06N 3/0445; G08G 1/0129; G08G 1/166; G06K 9/627; G06K 9/00805
USPC .......................................................... 701/23
See application file for complete search history.

(56) References Cited

U.S. PATENT DOCUMENTS

| | | | |
|---|---|---|---|
| 2019/0310648 A1* | 10/2019 | Yang | G06N 20/00 |
| 2020/0042656 A1* | 2/2020 | Zapolsky | G06K 9/00624 |
| 2020/0175364 A1* | 6/2020 | Xu | G06N 3/08 |

OTHER PUBLICATIONS

Hubmann, C, et al., "Automated Driving in Uncertain Enironments: Planning with Interaction and Uncertain Maneuver Prediction," IEEE Transactions on Intelligent Vehicles, vol. 3, No. 1, pp. 5-17, 2018.
Isele, D, et al., "Navigating Occluded Intersections with Autonomous Vehicles Using Deep Reinforcement Learning," in IEEE International Conference on Robotics and Automation.
Galceran, E, et al., "Augmented Vehicle Tracking Under Occlusions for Decision-Making in Autonomous Driving," in IEEE/RSJ International Conference on Intelligent Robots and Systems (IROS), 2015.
Chae, H, et al., "Autonomous Braking System via Deep Reinforcement Llearning," in IEEE International Conference on Intelligent Transportation Systems (ITSC), 2017.
Alonso, J, et al., "Autonomous vehicle control systems for safe crossroads," Transportation Research Part C; Emerging Technologies, vol. 19, No. 6, pp. 1095-1110, 2011.
Garcia, J, et al., "A Comprehensive Survey on Safe Reinforcement Learning," in Journal of Machine Learning Research, 2015. 44 Pages.
Chryssanthacopoulos, J.P., et al.J. P., "Decomposition methods for optimized collision avoidance with multiple threats," AIAA Journal of Guidance, Control, and Dynamics, vol. 35, No. 2, pp. 398-405, 2012.
Wray, K.H., et al., "Online decision-making for scalable autonomous systems," in International Joint Conference on Artificia Intelligence (IJCAI), 2017.
Alshiekh, M,for R. Intelligent Transportation Systems,Bloem, R. Ehlers, B. Konighofer, 2017. Niekum, S, et al., "Safe Reinforcement Learning via Shielding," in AAAI Conference on Artificial Intelligence (AAAI), 2018. 23 Pages.
Bouton, M, et al., "Belief State Planning for Autonomously Navigating Urban Intersections," in IEE E Intelligent Vehicles Symposium (IV, 2017. 6 Pages.
Bouton, M, et al., "Reinforcement Learning with Probabilistic Guarantees for Autonomous Driving," in UAI Workshop on Safety, Risk and Uncertainly in Reinforcement Learning, 2018, 9 Pages.
Igl, M, et al., "Deep Variational Reinforcement Learning for POMDPS," in International Conference on Machine Learning (ICML), 2018. 17 Pages.
Littman, M.L., et al., "Learning policies for partially observable environments: Scaling up," in International Conference on Machine Learning (ICML),1995. 59 Pages.
Mukadam, M, et al., "Tactical Decision Making for Lane Changing with Deep Reinforcement Learning," in NIPS Workshop on Machine Learning for Intelligent Transportation Systems, 2017. 7 Pages.
Sollich, P, et al., "Learning with ensembles: How overfittng can be useful," in Advances in Neural Information Processing Systems (NIPS), 1995. 7 Pages.
Wang, P, et al., "A Reinforcement Learning Based Approach for Automated Lane Change Maneuvers," in IEEE Intelligent Vehicles Symposium (IV), 2018. 6 Pages.
Bellman, R, Dynamic Programming. Princeton University Press, 1957. pp. 81-115.
Brechtel, S, et al., "Probabilistic Decision-Making Under Uncertainty for Autonomous Driving Using Continuous Pomdps," in IEEE International Conference on Intelligent Transportation Systems (ITSC), 2014. 8 Pages.
Tram, T, et al., "Learning Negotiating Behavior Between Carsin Intersections Using Deep Q-Learning," in IEEE International Conference on Intelligent Transportation Systems (ITSC), 2018. 6 Pages.
Kochenderfer, M.J., Decsion Making Under Uncertainty: Theory and Application. MIT Press, 2015. 21 Pages.
Mnih, V, et al., "Human-level control through deep reinforcement learning" vol. 518, No. 7540, pp. 529-533, 2015.

* cited by examiner

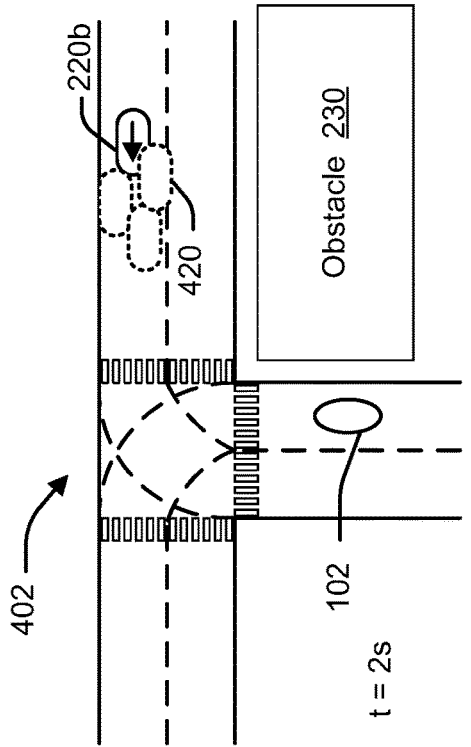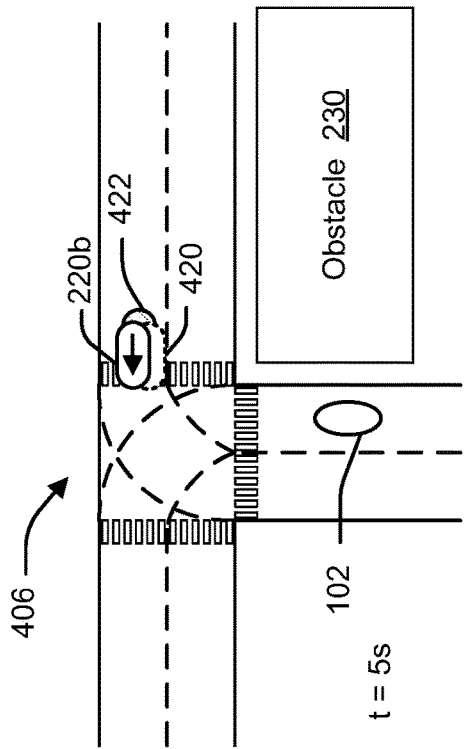
FIG. 4B
FIG. 4D
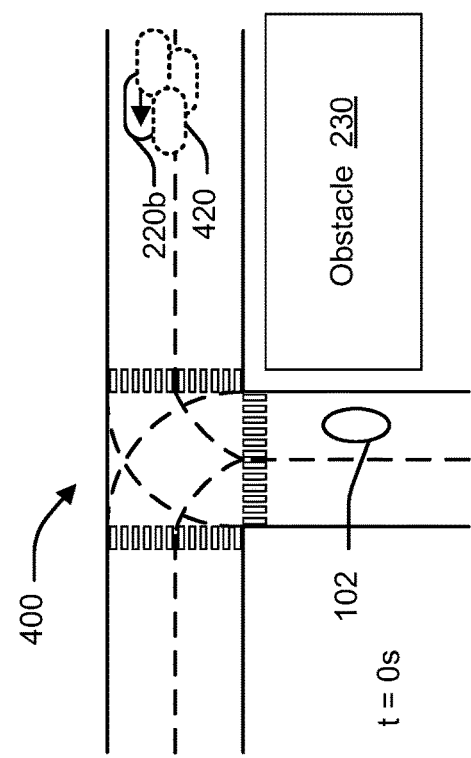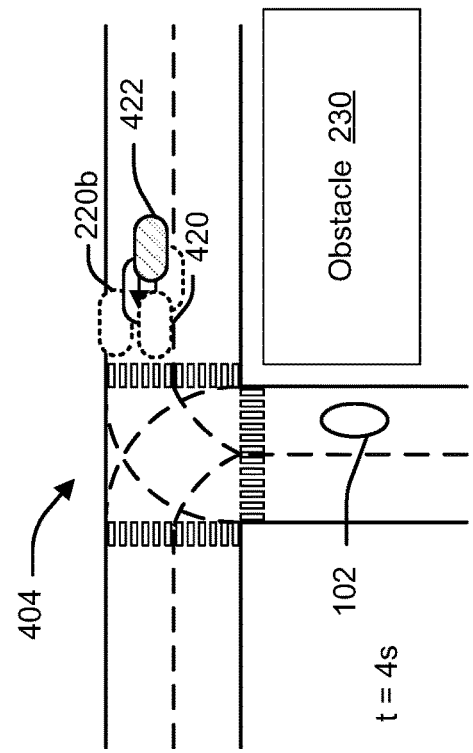
FIG. 4A
FIG. 4C

REINFORCEMENT LEARNING WITH SCENE DECOMPOSITION FOR NAVIGATING COMPLEX ENVIRONMENTS

CROSS-REFERENCE TO RELATED APPLICATION(S)

This disclosure claims the benefit of U.S. Provisional Application Ser. No. 62/799,593, entitled "Safe Reinforcement Learning with Scene Decomposition for Navigating Complex Urban Environments" and filed on Jan. 31, 2019, which is expressly incorporated by reference herein in its entirety.

TECHNICAL FIELD

The present disclosure relates to vehicle navigation, in particular, reinforcement learning with scene decomposition for navigating complex environments by a vehicle.

BACKGROUND

Automated driving has the potential to significantly improve occupant and vehicle safety. Although major progress in enabling automated driving technology has been made in recent years, autonomously navigating urban environments efficiently and reliably remains challenging. For example, at road intersections, some vehicles may navigate among both cars and pedestrians, using on board perception systems that may provide high-volume estimates of location and velocity of other vehicles on the road, and are sensitive to occlusions.

To assist vehicles in certain complex environments, some vehicles may include navigation systems that provide decisions or predictions for the vehicles to navigate through the environments. For example, a vehicle may include a rule-based strategy to navigate, as such an environment may require anticipating a vast space of possible situations. In some navigation systems, a common heuristic strategy may use a threshold on the time to collision. Such an approach may perform well in simple scenarios but does not take into account sensor uncertainty and is unlikely to scale to complex environments. Alternatively, some navigation systems may use a partially observable Markov decision process (POMDP), which may provide a principled framework to model uncertainty of an intent of other drivers through latent variables, as well as integrating perception and planning. However, these methods are often difficult to scale in environments with multiple road users.

Therefore, there is a need in the art for improvements in efficiency, robustness, and scalability of decision making by vehicles in complex driving environments.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an aspect, a method may include receiving observation data from one or more sensors of the vehicle. The method may also include generating projection data corresponding to the one or more traffic participants based on the observation data for each time step within a time period. The method may further include predicting interactions between the vehicle, the one or more traffic participants, and the one or more obstacles, based on the projection data of the one or more traffic participants. The method may include determining a set of actions by the vehicle corresponding to a probability of the vehicle safely arriving at a target location based on the predicted interactions. The method may further include selecting one or more actions from the set of actions and provide the one or more actions to a navigation system of the vehicle.

In other aspects, systems and computer-readable medium may perform the method disclosed herein for providing navigation for a vehicle are disclosed.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects when read in conjunction with the accompanying drawings, wherein:

FIGS. 4A-4D illustrate conceptual views of prediction states of the vehicle of FIG. 1, according to aspects of the present disclosure;

DETAILED DESCRIPTION

Figure 1:
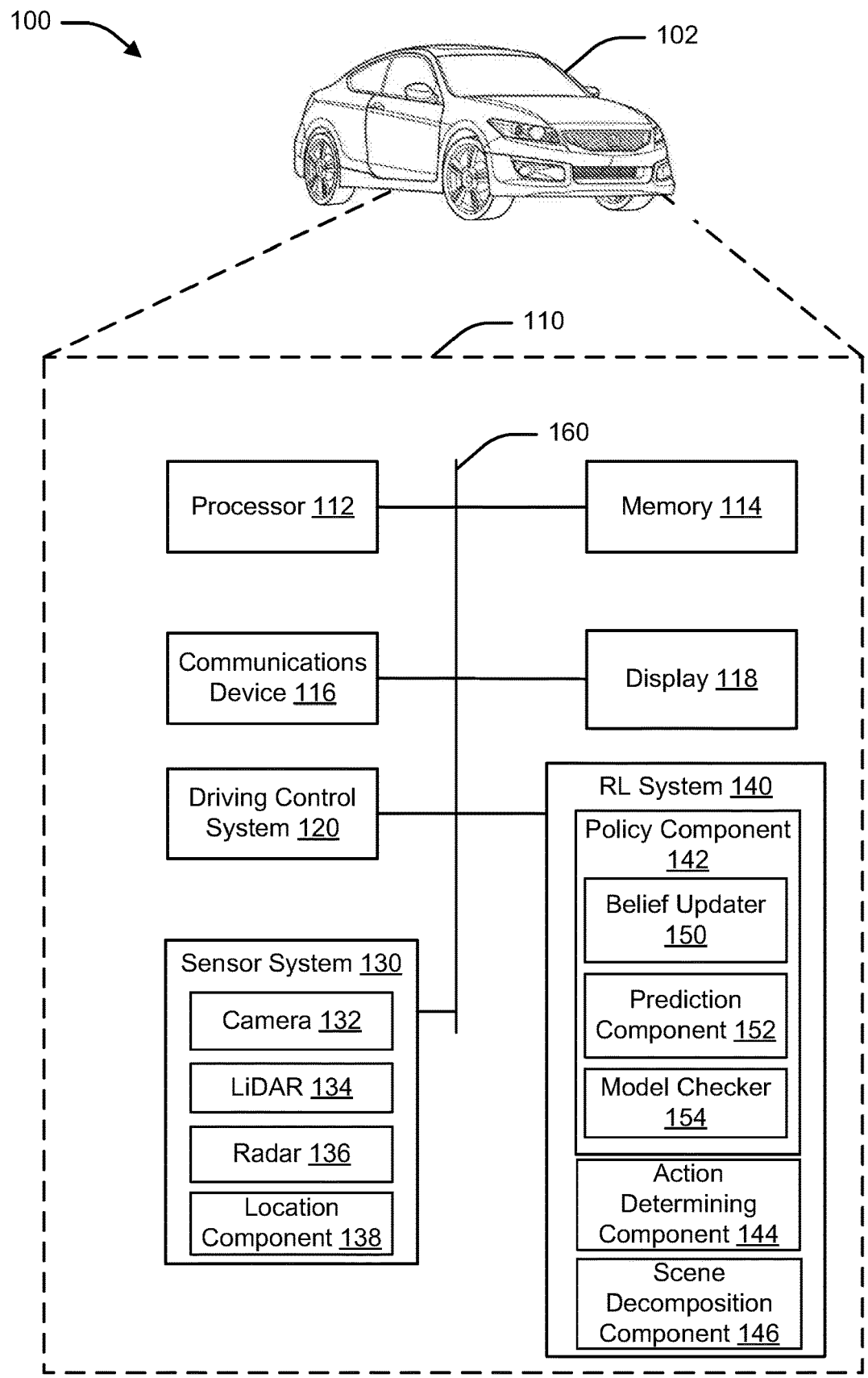
FIG. 1 illustrates a block diagram of an example operating environment of a navigation system for a vehicle, according to aspects of the present disclosure.

The following includes definitions of selected terms employed herein. The definitions include various examples and/or forms of components that fall within the scope of a term and that may be used for implementation. The examples are not intended to be limiting.

The term "bus," as used herein, may refer to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area Network (CAN), Local Interconnect Network (LIN), among others.

The term "vehicle," as used herein, may refer to any mechanically and/or electrically moving object that is capable of carrying one or more human occupants. Examples of a vehicle, may include, but are not limited to: cars, trucks, vans, minivans, SUVs, motorcycles, scooters, boats, personal watercraft, and aircraft. The term "ego vehicle," as used herein, may refer to a vehicle including systems, methods, and computer-readable medium corresponding to one or more aspects of the present disclosure. The term "autonomous vehicle," as used herein, may refer to a vehicle having capabilities to perform one or more driving actions (e.g., braking, accelerating, steering) without user assistance.

The term "memory," as used herein, may include volatile memory and/or nonvolatile memory. Non-volatile memory may include ROM (read only memory), PROM (programmable read only memory), EPROM (erasable PROM) and EEPROM (electrically erasable PROM). Volatile memory may include RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, may include a connection by which entities are "operably connected", is one in which signals, physical communications, and/or logical communications may be sent and/or received. An operable connection may include a physical interface, a data interface and/or an electrical interface.

The term "processor," as used herein, may refer to a device that processes signals and performs general computing and arithmetic functions. Signals processed by the processor may include digital signals, data signals, computer instructions, processor instructions, messages, a bit, a bit stream, or other computing that may be received, transmitted and/or detected. A processor may include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "vehicle system," as used herein, may refer to an electronically controlled system on a vehicle operable to perform certain actions on components of the vehicle, which may provide an interface to allow operation by another system or graphical user interaction. The vehicle systems may include, but are not limited to, vehicle ignition systems, vehicle conditioning systems (e.g., systems that operate a windshield wiper motor, a windshield washer fluid motor or pump, a defroster motor, heating, ventilating, and air conditioning (HVAC) controls, etc.), vehicle audio systems, vehicle security systems, vehicle video systems, vehicle navigation systems, vehicle infotainment systems, vehicle telephone systems, and the like.

The term "vehicle applications" or "applications," as used herein, may refer to any software run by the vehicle system, which may provide information or data to a user of the vehicle, or may receive information or data from a user of a vehicle. The vehicle applications may be displayed on a display and may include, but are not limited to, navigation, radio, telephone, settings, electric charging, status information, cameras, web browsers, e-mail, games, utilities, and the like.

The term "graphical user interface," "GUI," or "user interface," as used herein, may refer to a type of interface that allows users to interact with electronic devices, the vehicle system, the vehicle, vehicle applications or the like, through graphical icons, visual indicators such as secondary notation, text-based, type command labels, text navigation, and the like.

The term "screen," "display screen," or "display," as used herein, may refer to a surface area upon which text, graphics and video are temporarily made to appear for human viewing. These may include, but are not limited to, eidophor, electroluminescent display ("ELD"), electronic paper, e-Ink, gyricon, light emitting diode display ("LED"), cathode ray tube ("CRT"), liquid-crystal display ("LCD"), plasma display panel ("PDP"), digital light processing ("DLP"), and the like.

The term "communications device," as used herein, may refer to a device that facilitates intercommunication among vehicle systems, communication with the vehicle systems via one or more other systems or devices, etc. In an example, communication device may interface with other systems, such as a remote device, other computers, etc., via a wireless communication technology, such as a cellular technology, Bluetooth, etc. using a corresponding modem or transceiver.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of certain systems will now be presented with reference to various apparatuses and methods. These apparatuses and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Complex driving environments, such as a road intersection, may be difficult for vehicles to navigate due to one or more cars, pedestrians, or other obstacles. To assist vehicles at certain complex environments, some vehicles may include navigation systems that provide decisions or predictions for the vehicles to navigate through the environments.

Some navigation systems may use reinforcement learning (RL) as a way to automatically generate effective behaviors. RL has been applied to autonomous braking strategies at crosswalks, lane changing policies, and intersection navigation. However prior efforts using RL for navigation purposes have failed to improve driving while in complex environments.

While different techniques have been proposed to improve decision making algorithms of autonomous driving systems, these techniques often require an abstraction of the environment which may be difficult to design.

Turning now to the figures, examples of navigation systems and methods of navigation by a vehicle are described herein.

FIG. 1 shows a block diagram of an example of an operating environment 100 of a navigation system 110 and example methods according to aspects described herein. The operating environment 100 may include an ego vehicle 102, within which the navigation system 110 may at least partially reside and/or be implemented. Components of the navigation system 110, as well as the components of other systems, hardware architectures and software architectures discussed herein, may be combined, omitted or organized into different architectures for various aspects of the disclosure. However, example aspects and configurations discussed herein focus on the operating environment 100 as illustrated in FIG. 1, with corresponding system components and related methods.

The navigation system 110 may include or be operably coupled with (or executed by) one or more components including, but not limited to, a processor 112, a memory 114, a communications device 116, a display 118, driving control system 120, a sensory system 130, or an RL system 140. In an example, each of the components of the navigation system 110 may be interconnected via bus 130 for communication between the components.

The processor 112 and the memory 114 may communicate to effectuate certain functions or actions, as described herein. The processor 112 may be configured to execute instructions or code stored on the memory 114. In an implementation, the instructions or code may include instructions or code for navigating complex environments, as described herein. In an example, the processor 112 may include one or more processors for executing the instructions or code.

The communications device 116 may include substantially any wired or wireless device, or related modem, etc., for providing wired or wireless communications utilizing various protocols to send/receive electronic signals internally to features and systems within the ego vehicle 102 and/or to external devices. In an example, the communications device 116 may communicate using one or more radio technologies (e.g., 3GPP radio access technologies, IEEE 802.11, Bluetooth®).

The display 118 (interchangeably referred to herein as a screen) for displaying vehicle information (e.g., tachometer, speedometer, fuel gauge, heating/cooling), infotainment information (e.g., radio, media files), navigation information, and/or any other information or applications related to one or more vehicle systems. An example of the display 118 may include those described herein.

The driving control system 120 may be configured to control an action (e.g., steering, acceleration, braking) of the vehicle 102. The driving control system 120 may control the vehicle 102 based on navigation information received from one or more of the components of the navigation system 110. The driving control system 120 may include controllers that translate the information into inputs to different vehicle controls (e.g., steering, acceleration, braking).

The sensor system 130 may include one or more sensors that provide input to the different components of the navigation system 110. For example, the sensor system 130 may include one or more of a camera 132 or other image-capturing device (e.g., a scanner), a light detection and ranging (LiDAR) system 134, a radar system 136, or a location detection system 138 such as a global positioning system (GPS). The camera 132 may obtain images of a vehicle environment and the sensor system 130 may apply image recognition to perform object detection. The LiDAR system 134 may capture a point cloud by detecting reflected light beams. The sensor system 130 may analyze the point cloud to detect objects. Similarly, the radar system 136 may use reflected radio waves to detect objects. The location detection system 138 may provide a location of the vehicle 102. The sensor system 130 may combine the output of multiple sensors to determine a position, heading, velocity, and/or size of the vehicle 102 and/or other objects (e.g., traffic participants, obstacles). In an aspect, an object capable of moving (e.g., pedestrian, other vehicle) may be interchangeably referred to as a traffic participant.

The RL system 140 may determine actions of the vehicle 102 for navigation and/or autonomous driving. In an example, the RL system 140 may receive input (observation data) from the sensor system 130 and determine one or more actions for the vehicle 102 based on the input. In an example, the one or more actions may be provided to the driving control system 120 and used for vehicle controls (e.g., steering, acceleration, braking). In an aspect, the RL system 140 may include a policy component 142 for determining a set of actions for the ego vehicle 102 to undertake. The policy component 142 may include a projection data updater 150 (also referred to as a belief updater) for determining projection data (also referred to as perception data or belief data) based on received observation data, a prediction component 152 for modeling driving experiences based on the projection data, and a model checker 146 for modeling safe driving experiences based on the projection data. The RL system 140 may also include an action determining component 144 for determining one or more actions, and a scene decomposition component 146 for decomposing a scenario into multiple projections (also referred to as beliefs). The RL system 140 is described in further detail below with respect to FIGS. 2-5.

Figure 2:
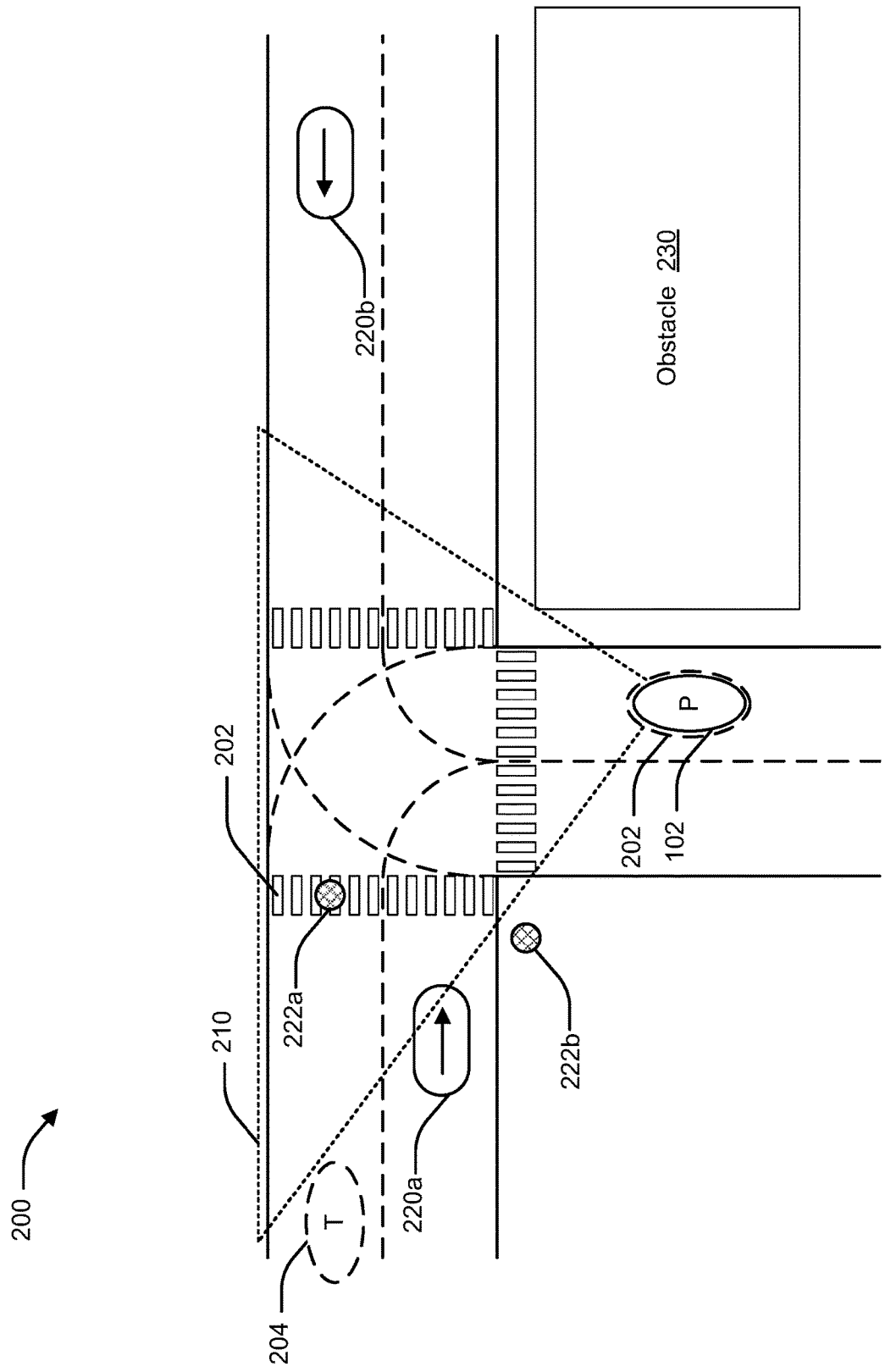
FIG. 2 illustrates a conceptual view of an example of a scenario for navigation by the vehicle of FIG. 1, according to aspects of the present disclosure.

Referring to FIG. 2, an example of a scenario 200 that the ego vehicle 102 may encounter is illustrated. Reference to the scenario 200 is used in describing example methods that the RL system 140 may use to determine one or more actions for navigation by the ego vehicle 102 from a present location 202 to a target location 204.

As shown in FIG. 2, the ego vehicle 102 may be stopped at an intersection. The sensor system 130 of the ego vehicle 102 may generate observation data (or sensor data) from one or more sensors. The observation data may indicate state information (e.g., position, heading, velocity, size) on objects detected within an observation range 210 (or sensor range) of the sensor system 130. As shown, the sensor system 130 may detect a plurality of traffic participants within the sensor range 210 including a vehicle 220a driving within the observation range 210 and a pedestrian 222a crossing a crosswalk 206. The sensor system 130 may also detect an obstacle 230, such as a structure, which may prevent the ego vehicle 102 from having a full range of detection.

As shown, the scenario 200 may also include one or more traffic participants, including vehicle 220b and pedestrian 222b, which are not detected within the observation range 210 of the sensor system 130. Such traffic participants, interchangeably referred to herein as "absent participants" may include any traffic participant that is not detected by the sensor system 130 and that may potentially affect an action of the ego vehicle 102 while moving from the present location 202 to the target location 204.

Figure 3:
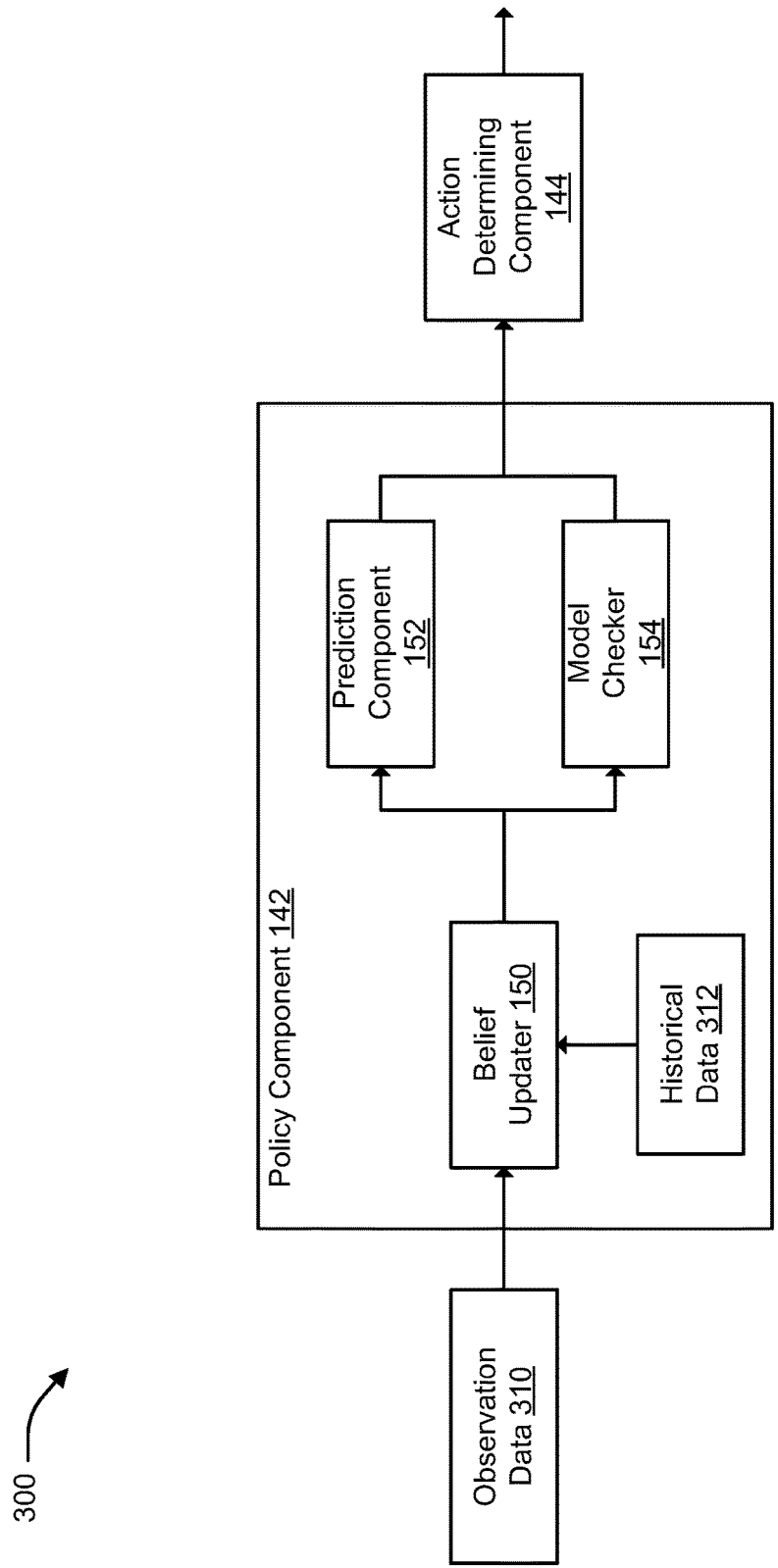
FIG. 3 illustrates a conceptual view of an example of a processing pipeline for navigating by the vehicle of FIG. 1, according to aspects of the present disclosure.

Referring to FIG. 3, therein shown is an example of a processing pipeline 300 that may be used by the RL system 140 while the ego vehicle 102 is at the scenario 200 is illustrated.

As shown, the policy component 142 may receive observation data 310 from the sensor system 130. The observation data 310 may indicate state information (e.g., position, heading, velocity, size) on objects (e.g., vehicle 220a, pedestrian 222a, obstacle 230) detected within an observation range 210 of the sensor system 130. When the observation data 310 is received, the projection data updater 150 may generate projection data based on the observation data 310. The projection data updater 150 may be a perception algorithm that generates the projection data based on historical observation data 312 and the current observation data 310. The projection data may represent the probability of a presence of a traffic participant at a given time within a time period. By generating the projection data, the projection data updater 150 may integrate perception error into the perception algorithm. In some examples, the projection data updater 150 may assume perfect data association for detected objects. For example, each object detected by the sensor system 130 may be associated to an identifier that is used consistently as projection data is generated or updated.

In an aspect, the projection data updater 150 may consist of a plurality recurrent neural networks (RNNs). In some examples, each network of the plurality of RNNs may be responsible for keeping track of the historical observation data 312. In an aspect, the input (i.e., observation data 310, historical observation data 312) of each of the RNNs may include is an observation vector, and the output may be a predicted ground truth position of observed objects such as the vehicle 220a and the pedestrian 222a as well as a probability of presence of additional objects. In an example, the input to each of the RNNs may be a sixteen dimension vector encoding an observed state of the ego vehicle 102, the vehicle 220a, the pedestrian 222a, and the obstacle 230. The prediction may include a ten dimension vector including the predicted state of the vehicle 2202a and the pedestrian 222a, and a probability of presence of the vehicle 220a and the pedestrian 222a.

In an aspect, each of the RNNs may be trained using a gradient descent on a mean squared error between ground truth trajectories and predicted trajectories. In an example, the plurality of RNNs may make the prediction more robust. For example, instead of training a single network, each of the plurality of networks may be trained on a different portion of a dataset. Those randomly initialized RNNs may converge to different local optima. As a result, each of the RNNs may give different predictions for a given input. In an example, the plurality of RNNs may include five RNNs, and five predictions may represent the projection data of the projection data updater 150.

To train an RNN, a synthetic dataset having a same simulation environment used for training an RL policy. The simulation environment may involve one ego vehicle, one other vehicle, and one pedestrian, as well as one obstacle randomly placed on the side of the road. In an example, a test simulation environment may include 3000 trajectories of 400 time steps of 0.1 seconds.

Referring to FIGS. 4A-4D, examples of prediction states 402-406 of the vehicle 220b as predicted by the projection data updater 150 as time increases is illustrated. As described herein, the vehicle 220b may be a vehicle located in an occluded area (i.e., an area not observable by the ego vehicle 102) due to the obstacle 230. As such, the ego vehicle 102 may predict a location of the vehicle 220b. As shown, one or more predicted vehicles 420 may be determined by one or more RNNs of the projection data updater 150. As shown, each of the predicted vehicles 420 may be different from all others, which may enhance the robustness of the prediction. As time increases, the probability of presence of the vehicle 220b behind the obstacle 230 may also increase since a constant rate of appearance may be assumed at every time step. As shown, in the last two prediction states 404 and 406, the vehicle 220b may be is observed (i.e., observed vehicle 422) and the predicted vehicles 420 may converge to a more accurate estimation.

As shown in FIG. 3, the projection data from the projection data updater 150 may be input to the prediction component 152 and the model checker 154 of the policy component 142 in parallel. The prediction component 152 may analyze the projection data and predict actions for the ego vehicle 102 to reach the target location 204. In an aspect, the prediction component 152 may model the scenario 200 based on a Markov Decision Process (MDP). An MDP is a mathematical framework defined by the tuple (S, A, T, R, γ), where S is a state space, A is an action space, T is a transition model, R is a reward function, and γ is a discount factor. In an example, the ego vehicle 102 may take an action a at a given state s, and the environment evolves to state s' with a probability T (s, a, s')=Pr (s|s', a). After every transition, the ego vehicle 102 may receive a reward r=R (s, a) for taking action a in state s. The action a may be chosen according to a policy π: S→A. The state-action utility of a policy π may be referred to as the quantity $Q^\pi (s, a) = E[\Sigma_{t=0}^{\infty} \gamma^t r_t | s_0 = s]$. This quantity may represent a discounted accumulated reward obtained by the ego vehicle 102 when taking action a from state s and then following policy π.

In an example, an MDP model may assume that the ego vehicle 102 observes a true state of the environment perfectly. However, in some examples, the ego vehicle 102 receives imperfect observations of the environment. Hence, an autonomous driving problem may be a partially observable Markov decision process (POMDP). In a POMDP, the ego vehicle 102 may represent knowledge of the environment with a projection state (also referred to as belief state) b: S→[0, 1] such that b(s) is the probability of being in a state s. At every time step, the ego vehicle 102 may receive an observation and updates its projection (i.e., belief), as described herein, by the projection data updater 150.

In an aspect, the prediction component 152 may use a QMDP approximation as follows Q (b, a)=$\Sigma_s$ $Q_{MDP}$ (s, a)b(s), where $Q_{MDP}$ is a solution to the problem considered as an MDP. In some examples, the QMDP approximation may assume that the state will be perfectly observable at a next time step.

In an aspect, the prediction component 152 may derive a simulation environment from an MDP formulation by sampling the transition model. In addition, the prediction component 152 may simulate perception error during evaluation, making the model a POMDP. The prediction component 152 may represent the state of a traffic participant c (e.g., vehicle 220a, pedestrian 222b) by $s_c$=(x, y, θ, v) which represent the position, heading, and longitudinal velocity of the traffic participant. A Cartesian frame with the origin at the center of the intersection may be used to define the position. The prediction component 152 may represent a fixed obstacle (e.g., obstacle 230) by a position and a size of the obstacle such that $s_{obs}$=(x, y, θ, l, w), where l is the length and w the width of the obstacle.

The prediction component 152 may also represent a global state by s=($s_{ego}$; $s_{c1:nc}$, $s_{p1:np}$, $s_{o1:no}$), where $s_{ego}$ represents a physical state of the ego vehicle, $s_{ci}$ represents the physical state of the i-th car in the environment with i=1 nc, where nc is the number of cars present in the environment, $s_{pi}$ represents the physical state of the i-th pedestrian in the environment with i=1 np, where np is the number of pedestrians present in the environment, and $s_{oi}$ is the pose of the i-th obstacle present in the environment with i=no, where no is the number of fixed obstacles present in the environment. Further, in some examples, an extra state variable, $s_{absent}$, may be added to model a potential incoming traffic participant (e.g., vehicle 220b, pedestrian 222b) that is not present in the scene.

In aspects of the disclosure, uncertainty about behavior of other traffic participants may be captured by the transition model (described below) and state uncertainty may only take into account sensor limitations. However, one skilled in the art would understand to extend the model described herein to include the intentions of drivers and pedestrians.

In an aspect, the prediction component 152 may model an acceleration of the ego vehicle 102 along a given path by choosing an acceleration level among a set of accelerations (e.g., {−4 m/s², −2 m/s², 0 m/s², 2 m/s²}) that may correspond a comfortable driving acceleration.

In an aspect, the prediction component 152 may design a transition model to capture interaction between traffic participants. For a state with a single vehicle c and a single pedestrian p, the transition model may be factorized as Pr (s'|s, a)=$P_{ego}$ ($s'_{ego}$|$s_{ego}$, a) $P_c$ ($s'_c$|s) $P_p$(s'|s), where $P_{ego}$ represents the dynamics of the ego vehicle 102 and is modeled by a deterministic point mass dynamic, and $P_c$ and $P_p$ represent the model of another vehicle (e.g., vehicle 220a) and a pedestrian (e.g., pedestrian 222a), respectively. In some examples, vehicle 220a may be modeled as following a rule-based policy described herein, and pedestrian 222a may be modeled as following a time to collision policy to decide whether the ego vehicle 102 is safe to cross the street. Hence, the actions of vehicle 220a and pedestrian 222a depend on respective states as well as the state of the ego vehicle 102. To describe uncertainty in the behavior of other vehicles, a Gaussian noise with standard deviation 2 m/s² may be added to the output of the rule-based policy. Pc may represent the model of the pedestrian 222a. In addition, the prediction component 152 may model new traffic participants (e.g., vehicle 220b, pedestrian 222b) to appear on the scene with a constant probability of appearance at each time step. Further, the prediction component 152 may model the traffic participants to appear at the beginning of any lane or crosswalk randomly with a random velocity.

In an aspect, the prediction component 152 may receive a noisy observation of the state according to a sensor model including a position measurement that follows a Gaussian distribution centered around the ground truth with standard deviation $\sigma_p$ growing linearly with the distance to the target, a velocity measurement that follows a same model with $\sigma_v$ growing linearly with the distance to the target, a false negative rate of 0:1 and a false positive rate of 0:1 if no targets are visible, and computation of an occlusion by a ray tracing technique, where if a segment connecting a front of the ego vehicle 102 and the target intersects with the obstacle 230, then the target location 204 may be occluded.

The model checker 154 may receive the projection data from the projection data updater 150 and compute a probability of the ego vehicle 102 reaching the target location 204 safely for each state-action pair prior to learning a policy. In an aspect, the model checker 154 may rely on a value iteration algorithm and may use a discretization of the state space and the full specification of the transition model. In some examples, the state space may be limited to longitudinal positions and velocities for the ego vehicle 102 and the traffic participants (e.g., vehicle 220a, pedestrian 222a), a variable indicating a lane of the vehicle 220a, and a variable indicating a crosswalk of the pedestrian 222a. For example, the pedestrian 222a may be on any of the three crosswalks considered and may travel in both direction (making it six values for the pedestrian lane), and the vehicle 220a may drive in any of the lanes shown by FIG. 2. In this example, by choosing resolutions of 2 m for the position and 2 m/s² for the velocity of the traffic participants, the number of states may be approximately 23×10⁶. In some examples, given a discrete representation (such as described herein), the probability of reaching the target location 204, $P_S$ (s, a), may be computed offline (i.e., computed during a training phase) using parallel value iteration.

Outputs of the prediction component 152 and the model checker 154 may be received by the action determining component 144. The action determining component 144 may include a safety threshold A used to constrain the ego vehicle 102 to take actions inside the set $A_{safe}$={a|$P_S$ (s, a)>λ}. In cases where the set Asafe is empty, the action determining component 144 may select a safest possible action given by the model checker 154. In cases where Asafe is not empty, the action determining component 144 may select any action within the set. In an aspect, the action determining component 144 may choose an action among the possible safe actions as follows:

$$\pi_{safe}(s) = \begin{cases} \text{argmax}_{a \in A_{safe}(s)} \, Q(s, a) & \text{if } A_{safe}(s) \neq 0 \\ \text{argmax}_a \, P_S(s, a) & \text{if } A_{safe}(s) = 0 \end{cases}$$

This constrained action selection strategy transfers the safety guarantees of the model checker 154 to the action determining component 144.

While the actions of the action determining component 144 are bound by those safe actions identified by the model checker 154, the ego vehicle 102 must also reach the target location 204 as fast as possible. Accordingly, a simple reward function that assigns a value of 1 to goal states may be used.

In an aspect, policy component 142 is trained using deep Q-learning with a constrained action space to enforce safety. The training environment of policy component 142 may be a continuous state space, simulated environment, following the model described herein, with only one other car and one pedestrian and perfect observation. In some examples, the policy component 142 may be modeled by a feedforward neural network with four layers of 32 nodes and rectified linear unit (ReLU) activations. Input to the policy component 142 may be a twelve dimensional vector with the positions (2D), longitudinal velocity, and heading of the ego vehicle 102, the complex reward design with terms for passenger comfort or social behavior.

Figure 5:
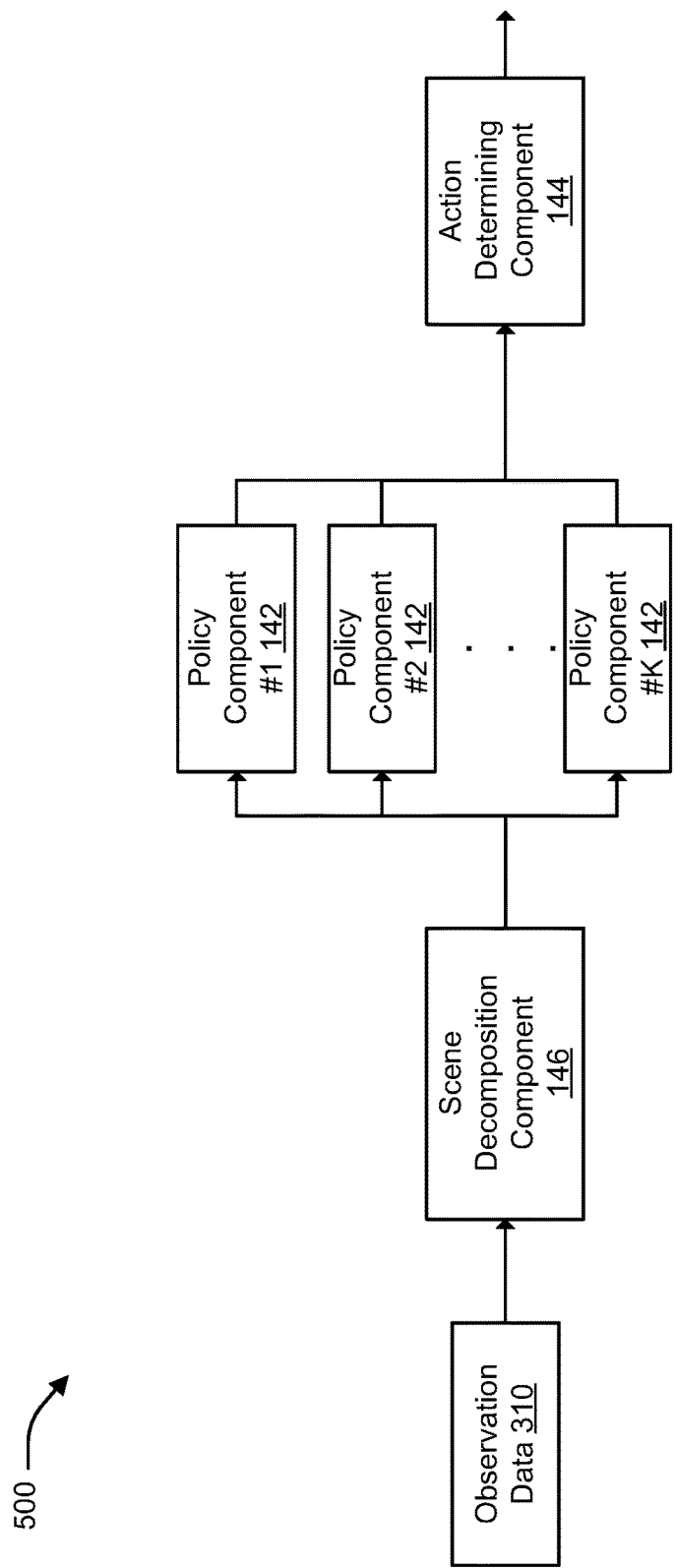
FIG. 5 illustrates a conceptual view of an example of a processing pipeline including a scene decomposition component, according to aspects of the present disclosure.

Referring to FIG. 5, an example of a processing pipeline 500 including the scene decomposition component 146 is illustrated. Thus far, examples of the scenario 200 have involved only three traffic participants. However, the RL system 140 is not limited in the number of traffic participants. In particular, the RL system 140 may determine actions in situations with multiple vehicles and pedestrians through the use of the scene decomposition component 146.

As shown in FIG. 5, observation data 310 may be received by the scene decomposition component 146. In the presence of multiple vehicles and pedestrians, the scene decomposition component 146 may represent the global projection (e.g., global belief) as $b=(b_{ego}, b_{c1}, b_{p1}, b_{o1})$, which may be decomposed into multiple instances of a canonical scenario, that is $b=\{(b_{ego}, b_{c1}, b_{p1}, b_{o1}), (b_{ego}, b_{c1}, b_{p1}, b_{o1})\}$. At each time step, $n_c \times n_p \times n_{obs}$ projections may be exist. Since $n_c$ and $n_p$ are not known in practice due to sensor occlusions, the scene decomposition component 146 may augment the global state variable with an additional vehicle and pedestrian observed as absent. Accordingly, the scene decomposition component 146 may assume that there is at least one traffic participant that might appear from an occluded area.

Once the projection state is decomposed into canonical projection states by the scene decomposition component 146, a plurality of policy components 142 may determine actions for the ego vehicle 102 based on the following approximation:

$$P_S(b, a) = \min_i P_S(b_i, a)$$

$$Q(b, a) = \min_i Q(b_i, a)$$

In an aspect, each of the policy components 142 may take into account the canonical projection with a worst probability of success and a worst utility. Further, the policy components 142 may rule out of decision traffic participants that are far from the ego vehicle 102 and present very little risk based on a higher utility and a higher probability of success. In an aspect, a computational cost of using the scene decomposition method may grow linearly with a number of vehicles or pedestrians considered. For example, once a projection state is decomposed, the policy components 142 may require evaluating Q and $P_S$ $n_c \times n_p \times n_{obs}$ times online (i.e., evaluated during an execution phase). Since Q and $P_S$ may be computed offline (i.e., computed during a training phase), the policy components 142 may evaluate Q and $P_S$ at a given projection point (i.e., belief point) involving a pass forward through a neural network and a table query which may be relatively fast.

In an aspect, the plurality of policy components 142 may send sets of actions to the action determining component 144 where an action for the ego vehicle 102 is selected, as previously described.

Figure 6:
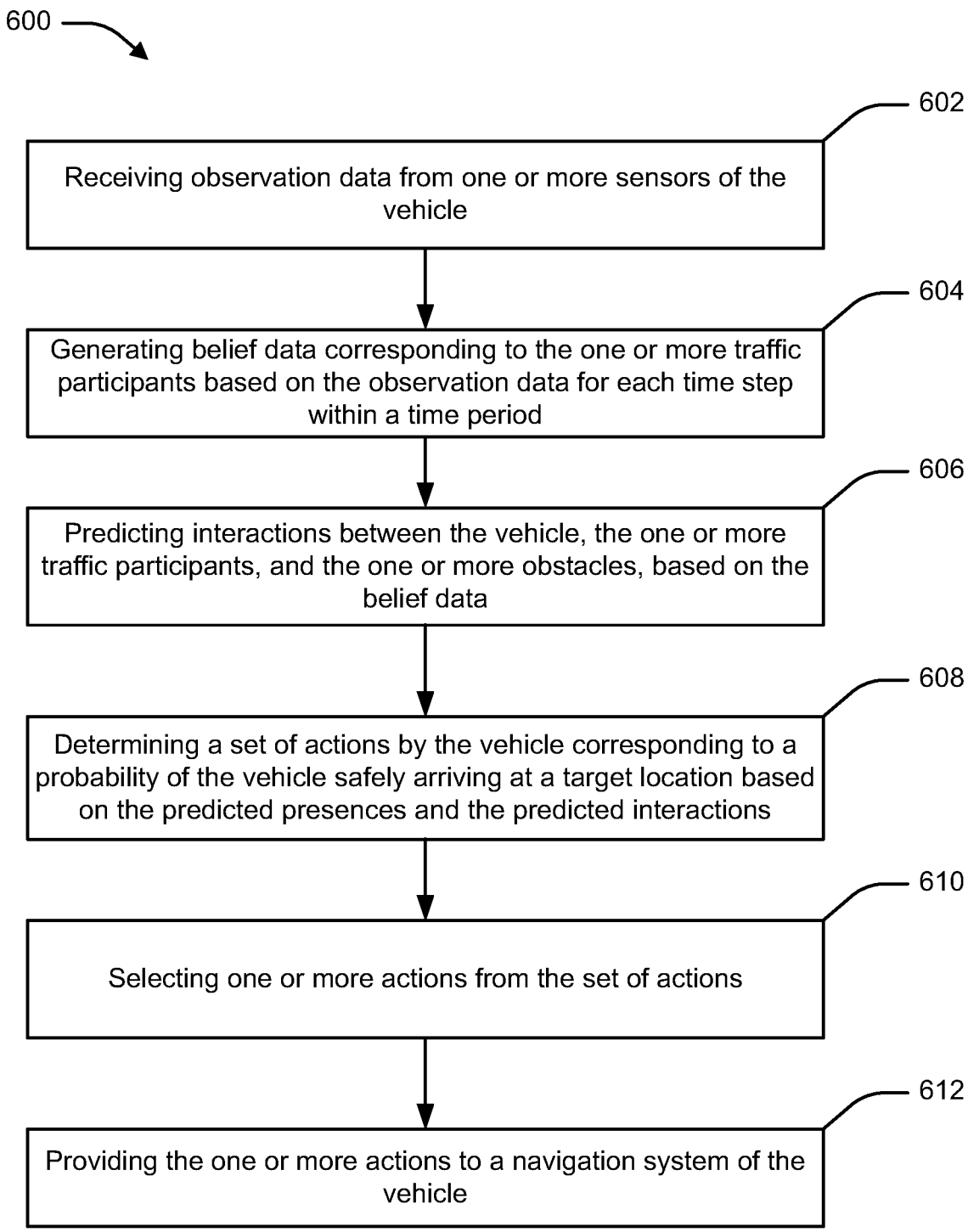
FIG. 6 illustrates a flowchart of an example of a method for performing navigation, according to aspects of the present disclosure.

Referring to FIG. 6, a method 600 for navigating complex environments is shown therein. In an example, the method 600 may be performed by one or more components (e.g., processor 112, memory 114, communications device 116, driving control system 120, sensory system 130, RL component 140) of the operating environment 100 of FIG. 1.

At 602, the method 600 may include receiving observation data from one or more sensors of the vehicle, wherein the observation data includes state information of the vehicle and one or more traffic participants or one or more obstacles. For example, one or more of the RL system 140, the projection data updater 150, or the scene decomposition component 146 may receive observation data 310 from one or more sensors of the sensor system 130 of the ego vehicle 102. In an example, the observation data may include a position, a heading, a velocity, and/or a size of the vehicle 102, one or more traffic participants (e.g., vehicle 220a, pedestrian 222a), or obstacle 230.

At 604, the method 600 may also include generating projection data corresponding to the observation data for each time step within a time period. For example, one or more of the RL system 140 or the projection data updater 150 may generate projection data corresponding to the one or more traffic participants based on the observation data for each time step within a time period. In an example, the projection data may represent the probability of a presence of a traffic participant at a given time within a time period.

At 606, the method 600 may further include predicting interactions between the vehicle, the one or more traffic participants, and the one or more obstacles, based on the projection data. For example, one or more of the RL system 140 or the model checker 154 may include predicting interactions between the vehicle 102, the one or more traffic participants (e.g., vehicle 220a, pedestrian 222a), and the one or more obstacles 230, based on the projection data.

At 608, the method 600 may include determining a set of actions by the vehicle corresponding to a probability of the vehicle safely arriving at a target location based on the predicted interactions. For example, one or more of the RL system 140 or the model checker 154 may determine a set of actions by the ego vehicle 102 corresponding to a probability of the ego vehicle 102 safely arriving at the target location 204 based on the projection data and the predicted interactions.

At 610, the method 600 may also include selecting one or more actions from the set of actions. For example, one or more of the RL system 140 or the action determining component 144 may select one or more actions from the set of actions. In an example, the action determining component 144 may include a safety threshold A used to constrain the ego vehicle 102 to take actions within a set of actions.

In some examples, the selecting of the one or more actions may include determining a set of timed actions by the ego vehicle 102 corresponding a time of the ego vehicle 102 to arrive at the target location 204. Further, the selecting of the one or more actions may also include selecting the one or more actions further based on the set of timed actions.

At 612, the method 600 may include providing the one or more actions to a navigation system of the vehicle. For example, one or more of the RL system 140 or the action determining component 144 may provide the selected one or more actions to the driving control component 120.

In some aspects, the method may further include the determining of the set of timed actions being performed by a trained deep Q-learning network (DQN). In some examples, the method 600 may further include receiving historical observation data, wherein the predicting of the presences is further based on historical observation data.

In some aspects, one or more of the predicting of the presences or the predicting of the interactions are performed by a plurality of recurrent neural networks (RNNs) trained on different portions of a dataset.

In some aspects, the method 600 may also include predicting presences of one or more potential traffic participants that are not observed by the one or more sensors, wherein the predicting of the presences is further based on the predicting of the potential traffic participants.

Figure 7:
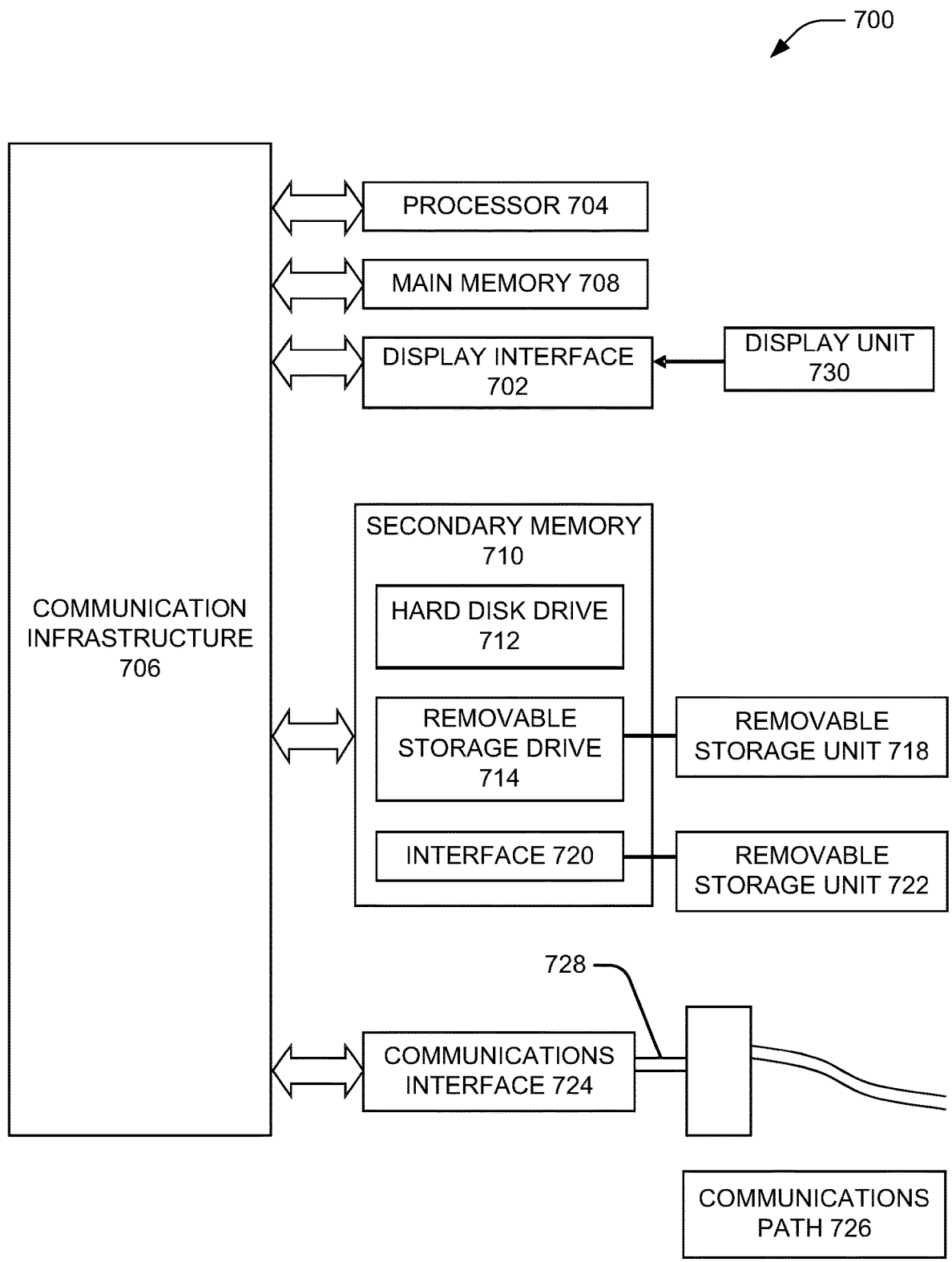
FIG. 7 is a block diagram of an example system including various hardware components and other features, according to aspects of the present disclosure.

Referring to FIG. 7, an example system is presented with a diagram of various hardware components and other features, for use in accordance with an aspect of the present disclosure. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system 700 is shown in FIG. 7.

The computer system 700 may include one or more processors, such as processor 704. The processor 704 is connected to a communication infrastructure 706 (e.g., a communications bus, cross-over bar, or network). The processor 704 may be an example of the processor 112. Various software aspects are described in terms of this example computer system 700. After reading this description, it will become apparent to a person skilled in the relevant art(s) how to implement aspects described herein using other computer systems and/or architectures.

The computer system 700 may include a display interface 702 that forwards graphics, text, and other data from the communication infrastructure 706 (or from a frame buffer not shown) for display on a display unit 730. The display unit 730 may be an example of the display 118. The computer system 700 may also include a main memory 708, e.g., random access memory (RAM), and may also include a secondary memory 710. The secondary memory 710 may include, e.g., a hard disk drive 712 and/or a removable storage drive 714, representing a floppy disk drive, a magnetic tape drive, an optical disk drive, etc. The removable storage drive 714 may read from and/or write to a removable storage unit 718 in a well-known manner. The removable storage unit 718, represents a floppy disk, magnetic tape, optical disk, etc., which is read by and written to the removable storage drive 714. As will be appreciated, the removable storage unit 718 may include a computer usable storage medium having stored therein computer software and/or data.

In alternative aspects, the secondary memory 710 may include other similar devices for allowing computer programs or other instructions to be loaded into the computer system 700. Such devices may include, e.g., a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to the computer system 700. The memory 114 may include one or more of the main memory 708, the secondary memory 710, the removable storage drive 714, the removable storage unit 718, or the removable storage unit 722.

The computer system 700 may also include a communications interface 724. The communications interface 724 may allow software and data to be transferred between the computer system 700 and external devices. Examples of the communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by the communications interface 724. These signals 728 are provided to the communications interface 724 via a communications path (e.g., channel) 726. This path 726 carries signals 728 and may be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals 728. These computer program products provide software to the computer system 700. Aspects described herein may be directed to such computer program products. In an example, the communications device 116 may include the communications interface 724.

Computer programs (also referred to as computer control logic) may be stored in the main memory 708 and/or the secondary memory 710. The computer programs may also be received via the communications interface 724. Such computer programs, when executed, enable the computer system 700 to perform various features in accordance with aspects described herein. In particular, the computer programs, when executed, enable the processor 704 to perform such features. Accordingly, such computer programs represent controllers of the computer system 700. The computer programs may include instructions or code for executing methods of the navigation system 110.

In variations where aspects described herein are implemented using software, the software may be stored in a computer program product and loaded into the computer system 700 using the removable storage drive 714, the hard disk drive 712, or the communications interface 720. The control logic (software), when executed by the processor 704, causes the processor 704 to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 8:
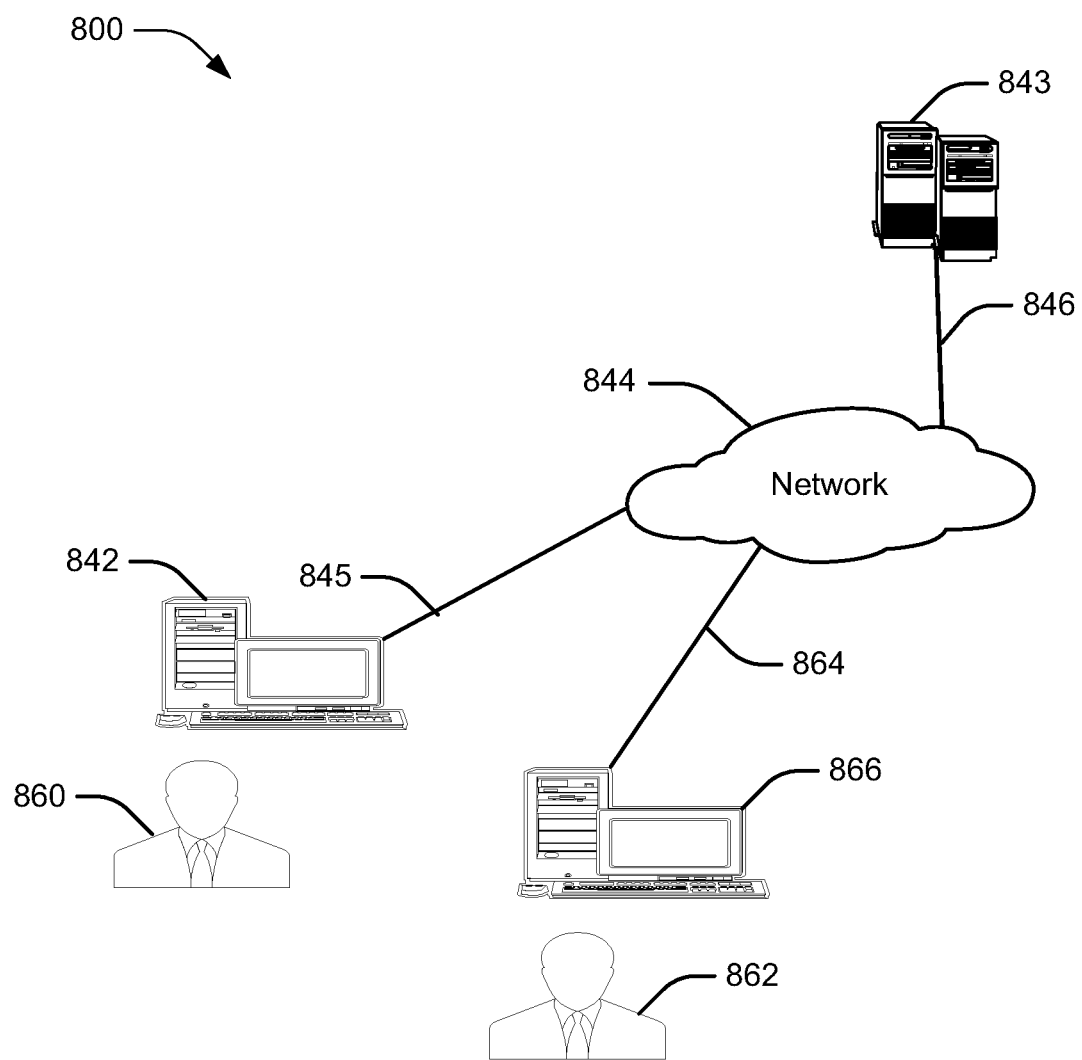
FIG. 8 is a block diagram of various example system components, according to aspects of the present disclosure.

FIG. 8 is a block diagram of various example system components. FIG. 8 shows a communication system 800 including one or more accessors 860, 862 (also referred to interchangeably herein as one or more "users") and one or more terminals 842, 866. The terminals 842, 866 may include the vehicle 102 or a related system (e.g., navigation system 110, the processor 112, the communications device 216, etc.), and/or the like. In one aspect, data for use in accordance with aspects described herein may be input and/or accessed by the accessors 860, 862 via the terminals 842, 866, such as personal computers (PCs), minicomputers, mainframe computers, microcomputers, telephonic devices, or wireless devices, such as personal digital assistants ("PDAs") or a hand-held wireless devices coupled to a server 843, such as a PC, minicomputer, mainframe computer, microcomputer, or other device having a processor and a repository for data and/or connection to a repository for data, via, a network 844 for instance, such as the Internet or an intranet, and couplings 845, 846, 864. The couplings 845, 846, 864 may include wired, wireless, or fiberoptic links. In another example variation, the method and system in accordance with aspects described herein operate in a stand-alone environment, such as on a single terminal.

The aspects discussed herein may also be described and implemented in the context of computer-readable storage medium storing computer-executable instructions. Computer-readable storage media includes computer storage media and communication media, and may be, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of providing navigation for a vehicle performed by a computing device of a navigation system, comprising:
   receiving, from one or more sensors mounted to the vehicle, observation data including state information of the vehicle, one or more traffic participants detected by the one or more sensors, and one or more obstacles detected by the one or more sensors;
   predicting one or more potential traffic participants that are unobserved by the one or more sensors due to the one or more obstacles;
   generating projection data corresponding to the one or more traffic participants based on the observation data for each time step within a time period, and corresponding to the one or more potential traffic participants that are unobserved by the one or more sensors due to the one or more obstacles;
   predicting potential interactions between the vehicle, the one or more traffic participants, and the one or more potential traffic participants that are unobserved by the one or more sensors due to the one or more obstacles, based on the projection data;
   determining a set of actions by the vehicle corresponding to a probability of the vehicle safely arriving at a target location based on the potential interactions;
   selecting one or more actions from the set of actions; and
   sending, to a component of the navigation system, data corresponding to the one or more actions, wherein the navigation system provides navigation instructions to the vehicle in response to the data corresponding to the one or more actions.

2. The method of claim 1, wherein the selecting of the one or more actions comprises:
   determining a set of timed actions by the vehicle corresponding a time of the vehicle to arrive at the target location; and
   selecting the one or more actions further based on the set of timed actions.

3. The method of claim 2, wherein the determining of the set of timed actions is performed by a trained deep Q-learning network (DQN).

4. The method of claim 1, wherein the selecting of the one or more actions from the set of actions is based on the one or more actions being greater than a threshold.

5. The method of claim 1, further comprising:
   receiving historical observation data, wherein the generating of the projection data is further based on the historical observation data.

6. The method of claim 1, wherein one or more of the generating of the projection data or the predicting of the potential interactions are performed by a plurality of recurrent neural networks (RNNs) trained on different portions of a dataset.

7. A vehicle computing device for a navigation system of a vehicle, comprising:
   a sensor system including one or more sensors mounted to the vehicle and configured to collect observation data;
   a memory storing executable instructions; and
   a processor coupled with the memory and configured to:
      receive, from the sensor system, observation data including state information of the vehicle, one or more traffic participants detected by the one or more sensors, and one or more obstacles detected by the one or more sensors;
      predict one or more potential traffic participants that are unobserved by the one or more sensors due to the one or more obstacles;
      generate projection data corresponding to the one or more traffic participants based on the observation data for each time step within a time period, and corresponding to the one or more potential traffic participants that are unobserved by the one or more sensors due to the one or more obstacles;
      predict potential interactions between the vehicle, the one or more traffic participants, and the one or more potential traffic participants that are unobserved by the one or more sensors due to the one or more obstacles, based on the projection data of the one or more traffic participants;
      determine a set of actions by the vehicle corresponding to a probability of the vehicle safely arriving at a target location based on the potential interactions;
      select one or more actions from the set of actions; and
      autonomously controlling the vehicle based on the one or more actions.

8. The vehicle computing device of claim 7, wherein the processor is further configured to:
   determine a set of timed actions by the vehicle corresponding a time of the vehicle to arrive at the target location; and
   selected the one or more actions further based on the set of timed actions.

9. The vehicle computing device of claim 8, wherein the processor includes a trained deep Q-learning network (DQN) to determine the set of timed actions.

10. The vehicle computing device of claim 7, wherein the one or more actions is selected based on the one or more actions being greater than a threshold.

11. The vehicle computing device of claim 7, wherein the processor is further configured to:

receive historical observation data, wherein the projection data is generated further based on the historical observation data.

12. The vehicle computing device of claim 7, wherein the processor includes a plurality of recurrent neural networks (RNNs) trained on different portions of a dataset to generate the projection data or predict the potential interactions.

13. A non-transitory computer-readable medium storing computer executable code for a computing device of a navigation system of a vehicle, comprising code to:
   receive, from one or more sensors mounted to the vehicle, observation data including state information of the vehicle, one or more traffic participants detected by the one or more sensors, and one or more obstacles detected by the one or more sensors;
   predict one or more potential traffic participants that are unobserved by the one or more sensors due to the one or more obstacles;
   generate projection data corresponding to the one or more traffic participants based on the observation data for each time step within a time period, and corresponding to the one or more potential traffic participants that are unobserved by the one or more sensors due to the one or more obstacles;
   predict potential interactions between the vehicle, the one or more traffic participants, and the one or more potential traffic participants that are unobserved by the one or more sensors due to the one or more obstacles, based on the projection data;
   determine a set of actions by the vehicle corresponding to a probability of the vehicle safely arriving at a target location based on the potential interactions;
   select one or more actions from the set of actions; and
   send, to a component of the navigation system, data corresponding to the one or more actions, wherein the navigation system provides navigation instructions to the vehicle in response to the data corresponding to the one or more actions.

14. The non-transitory computer-readable medium of claim 13, further comprising code to:
   determine a set of timed actions by the vehicle corresponding a time of the vehicle to arrive at the target location; and
   select the one or more actions further based on the set of timed actions.

15. The non-transitory computer-readable medium of claim 13, further comprising code to:
   select the one or more actions from the set of actions based on the one or more actions being greater than a threshold.

16. The non-transitory computer-readable medium of claim 13, further comprising code to:
   receive historical observation data; and
   generate the projection data further based on the historical observation data.

17. The non-transitory computer-readable medium of claim 13, further comprising code to:
   perform one or more of generating of the projection data or predicting of the potential interactions by a plurality of recurrent neural networks (RNNs) trained on different portions of a dataset.

* * * * *